(12) United States Patent
Higgins et al.

(10) Patent No.: US 9,463,971 B2
(45) Date of Patent: Oct. 11, 2016

(54) TESTABLE OVERFILL PREVENTION VALVE

(75) Inventors: Jeromy E. Higgins, Clayton, NC (US); Charles J. Liebal, Jr., Raleigh, NC (US)

(73) Assignee: OPW FUELING CONTAINMENT SYSTEMS, INC., Smithfield, NC (US)

( * ) Notice: Subject to any disclaimer, the term of this patent is extended or adjusted under 35 U.S.C. 154(b) by 749 days.

(21) Appl. No.: 13/401,213

(22) Filed: Feb. 21, 2012

(65) Prior Publication Data

US 2013/0213480 A1  Aug. 22, 2013

(51) Int. Cl.
*F16K 31/18* (2006.01)
*B67D 7/36* (2010.01)

(52) U.S. Cl.
CPC .......... *B67D 7/365* (2013.01); *Y10T 29/49826* (2015.01); *Y10T 137/0318* (2015.04); *Y10T 137/7358* (2015.04)

(58) Field of Classification Search
CPC ............ B67D 7/365; Y10T 29/49826; Y10T 137/7358; Y10T 137/0318; Y10T 137/6004; Y10T 137/0491; Y10T 137/053; Y10T 137/73; Y10T 137/7361; Y10T 137/7365; Y10T 137/7475; Y10T 137/7485; F16K 31/086; G01F 23/64
USPC .......... 137/15.18, 15.26, 390, 410, 411, 445, 137/448; 141/95, 198
See application file for complete search history.

(56) References Cited

U.S. PATENT DOCUMENTS

| | | | |
|---|---|---|---|
| 1,462,253 A * | 7/1923 | Tobiasson ..................... | 137/448 |
| 1,689,066 A | 10/1928 | Baxter | |
| 2,299,360 A * | 10/1942 | Tharp .......................... | 137/390 |
| 2,752,932 A * | 7/1956 | Newboult ..................... | 137/82 |
| 2,871,873 A * | 2/1959 | McQueen .................. | B64F 1/28 137/390 |
| 3,212,751 A * | 10/1965 | Hassa ........................... | 251/65 |
| 3,233,625 A * | 2/1966 | Pase ............................ | 137/416 |
| 3,448,633 A | 6/1969 | Jackoboice | |
| 4,618,824 A | 10/1986 | Magee et al. | |
| 4,785,842 A * | 11/1988 | Johnson, Jr. .................. | 251/65 |
| 4,848,388 A | 7/1989 | Waldbusser | |

(Continued)

FOREIGN PATENT DOCUMENTS

| | | |
|---|---|---|
| DE | 102005003054 | 9/2006 |
| FR | 2252283 | 6/1975 |

(Continued)

OTHER PUBLICATIONS

Ast Overfill Prevention Valve, 1228 Series, Clay and Bailey, date on publication Oct. 2008, (taken from the website of ww.claybailey.com on Jun. 9, 2015).*

(Continued)

*Primary Examiner* — Craig J Price
(74) *Attorney, Agent, or Firm* — Thompson Hine LLP

(57) ABSTRACT

An overfill prevention valve system including an overfill prevention valve having a blocking component. The blocking component is movable between a closed position, wherein the blocking component generally blocks fluid from flowing through the valve, and an open position, wherein the blocking component generally allows fluid to flow through the valve. The valve further including a float operatively coupled to the blocking component. The system additionally has an actuator that is operable to directly or indirectly move the blocking component to at least one of its open or closed positions to thereby enable testing of the overfill prevention valve.

42 Claims, 8 Drawing Sheets

(56) References Cited

U.S. PATENT DOCUMENTS

| | | | |
|---|---|---|---|
| 5,080,126 A * | 1/1992 | De Rycke et al. | 137/445 |
| 5,174,345 A | 12/1992 | Kesterman et al. | |
| 5,398,661 A | 3/1995 | Denz et al. | |
| 5,850,849 A | 12/1998 | Wood | |
| 6,089,258 A * | 7/2000 | Busick et al. | 137/422 |
| 6,382,246 B2 | 5/2002 | Mori et al. | |
| 6,536,465 B2 | 3/2003 | David et al. | |
| 6,732,388 B2 * | 5/2004 | McKenna | 137/428 |
| 6,913,047 B1 | 7/2005 | Kane et al. | |
| 7,089,974 B2 * | 8/2006 | Stuart | 141/198 |
| 7,243,675 B2 | 7/2007 | Kane et al. | |
| 7,584,766 B2 | 9/2009 | David et al. | |
| 7,644,723 B2 * | 1/2010 | Zsigmond | 137/172 |
| 8,020,576 B2 | 9/2011 | Lauber et al. | |
| 8,037,933 B1 | 10/2011 | Levy | |
| 2004/0050424 A1 * | 3/2004 | Sosa | F16K 21/18 137/389 |
| 2010/0314565 A1 * | 12/2010 | Barnham | 251/65 |

FOREIGN PATENT DOCUMENTS

| | | |
|---|---|---|
| GB | 2380992 | 4/2003 |
| GB | 2410537 | 8/2005 |

OTHER PUBLICATIONS

European Search Report and Search Opinion, European Application No. 13155671.4, May 14, 2013.

"PEI/RP1200-12 Recommended Practices for the Testing and Verification of Spill, Overfill, Leak Detection and Secondary Containment Equipment at UST Facilities," Petroleum Equipment Institute, Tulsa, OK (Jan. 24, 2012).

"1228 Testable Overfill Prevention Valve," web page of Clay and Bailey Mfg. Co., http://www.claybailey.com/shopexd.asp?id=1583 (2011).

"Emco Wheaton Phase I Enhanced Vapor Recovery (EVR) System," Emco Wheaton Retail Corporation (Sep. 2006).

EP, Examination Report, European Application No. 13155671.4, dated Jun. 3, 2015.

EP, Examination Report, European Application No. 13155671.4 (Mar. 23, 2016).

\* cited by examiner

TESTABLE OVERFILL PREVENTION VALVE

The present invention is directed to an overfill prevention valve, and more particularly, to a testable overfill prevention valve for use with a storage tank.

BACKGROUND

Fluid storage tanks are often utilized at fuel refilling stations and the like to store fluid for subsequent removal or dispensing. The storage tanks are typically refilled with fluid from an external source, such as a tanker truck. The tank may include an overfill prevention valve to prevent overfilling, which can help to prevent spills, reduce environmental damage and minimize loss of fluid. However, existing overfill prevention valves may not provide sufficient test functionality to ensure proper operation of the valve.

SUMMARY

In one embodiment the present invention is an overfill prevention valve that is testable to ensure proper functionality of the valve. More particularly, in one embodiment the invention is an overfill prevention valve system including an overfill prevention valve having a blocking component. The blocking component is movable between a closed position, wherein the blocking component generally blocks fluid from flowing through the valve, and an open position, wherein the blocking component generally allows fluid to flow through the valve. The valve further including a float operatively coupled to the blocking component. The system additionally has an actuator that is operable to directly or indirectly move the blocking component to at least one of its open or closed positions to thereby enable testing of the overfill prevention valve.

DETAILED DESCRIPTION

Figure 1:
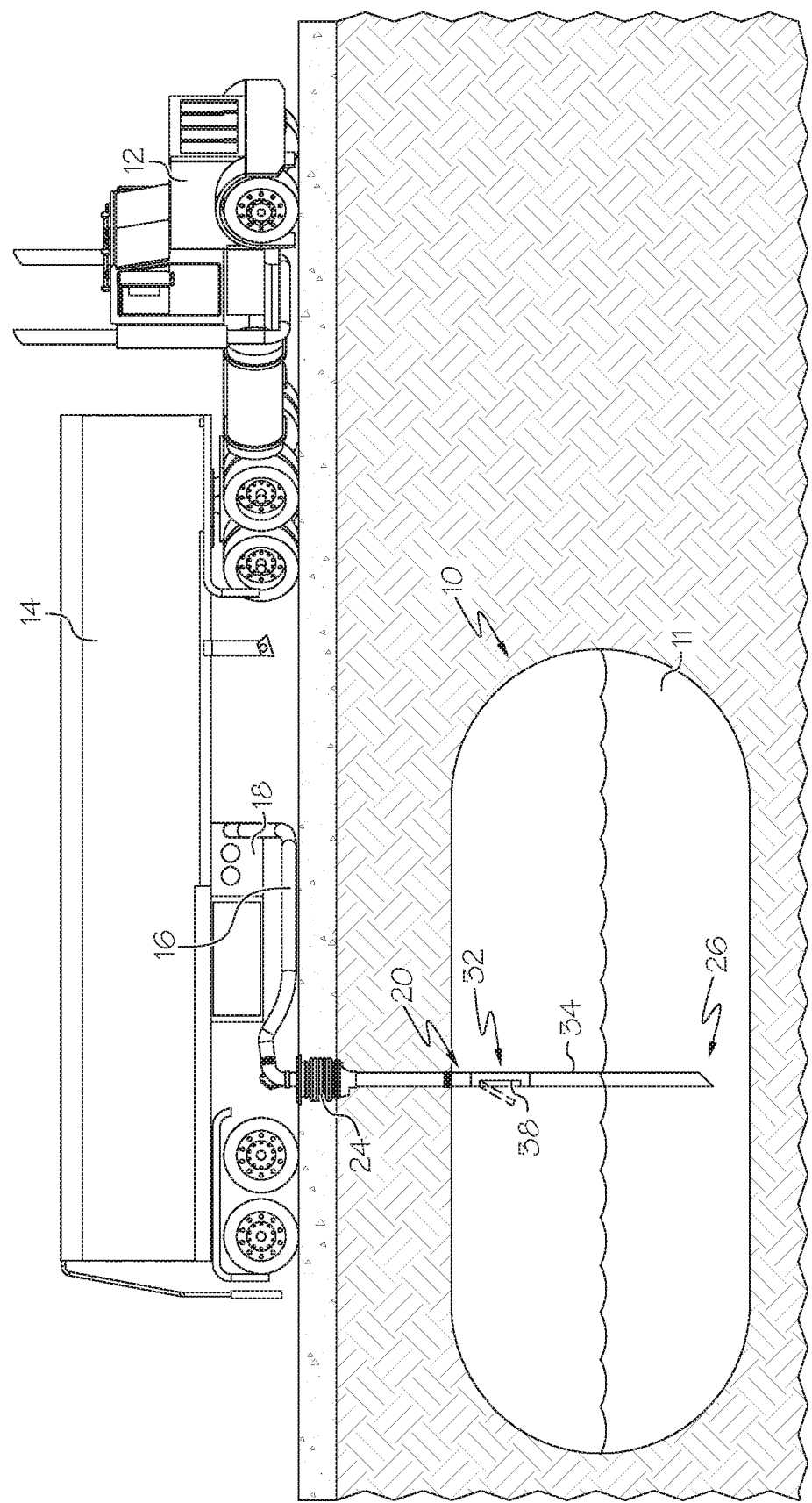
FIG. 1 is a side view of a storage tank being filled by a refilling tank truck.

As shown in FIG. 1, the system described and shown herein may include, or be used in conjunction with, a fluid storage tank or reservoir 10 that is configured to store fluid 11 therein. The storage tank 10 can be used store any of a wide variety of liquids, fluids or fuels, including but not limited to petroleum-based fuels, such as gasoline and gasoline blends, diesel, natural gas, fuel oils, biofuels, propane, oil or the like, or ethanol the like. FIG. 1 illustrates the fluid storage tank 10 positioned below-ground, but the fluid storage tank 10 could also be positioned partially or entirely above ground. The storage tank 10 can be positioned at, or form part of, a fuel refilling station, such as a gas station or the like. However the storage tank 10 can also be positioned at a variety of other locations and/or used in differing manners.

FIG. 1 illustrates a truck 12 coupled to a refilling tank 14 that is, in turn, fluidly coupled to the storage tank 10 via a hose or dispensing line 16. The illustrated refilling tank 14 has a pump 18 on its underside for evacuating the contents of the refilling tank 14 through the dispensing line 16.

The tank 10 may include, or be coupled to, a fill pipe system 20 having an upper end 22 (FIG. 2) positioned inside a spill bucket 24, and a lower end 26 positioned adjacent to a bottom of the tank 10. The upper end 22 of the fill pipe system 20 includes a fitting 28 (FIG. 2) that is removably attachable to a nozzle fitting (not shown) positioned at the distal end of the dispensing line 16. The fitting 28 is, in turn, coupled to an extension tube 30 that is coupled to the spill bucket 24. The spill bucket 24 is also coupled to a lower fitting 29 which is coupled to a connecting tube 31. The connecting tube 31 is coupled to the tank 10 and receives the upper part of an overfill prevention valve 32 therein, and with an annular gap positioned between the connecting tube 31 and overfill prevention valve 32. The overfill prevention valve 32 can be considered to be coupled to and/or form a part of the tank 10 and/or fill pipe system 20, and includes a lower fill pipe portion 34 coupled to the bottom end thereof. In the illustrated embodiment the valve 32 is positioned at or adjacent to an upper end of the tank 10.

The spill bucket 24 includes a cover (not shown) removably attached to a top of the spill bucket 24, and a dust cap (not shown) may be removably positioned at the top of the fitting 28/fill pipe system 20. Thus, in order to refill the tank 10, an operator removes the cover and dust cap, couples the dispensing line 16 to the fitting 28/fill pipe system 20, and operates the pump 18 to pump fluid from the refilling tank 14 to the storage tank 10.

Figure 2:
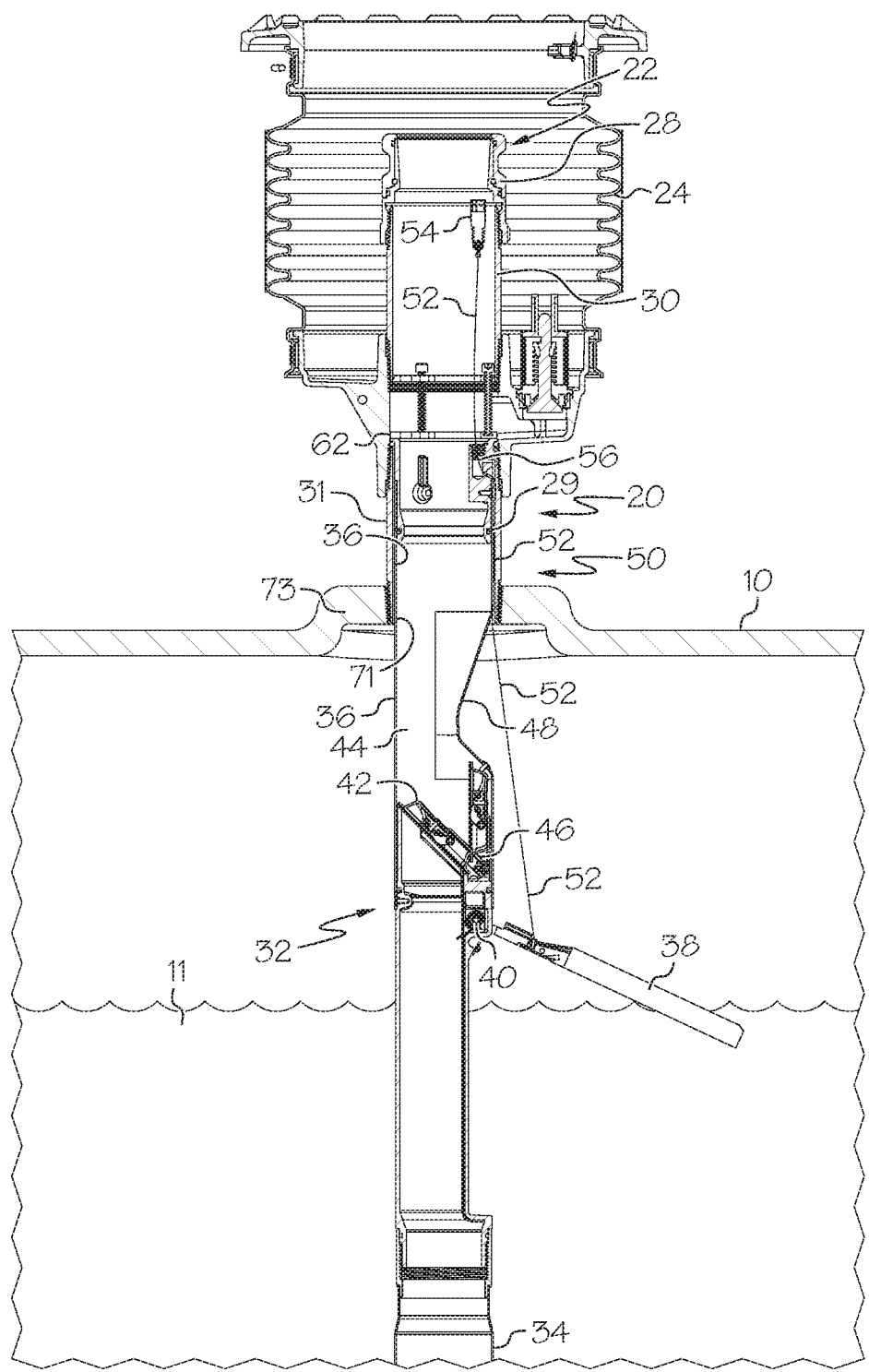
FIG. 2 is a detail cross section of the spill bucket and overfill prevention valve of FIG. 1.
Figure 3:
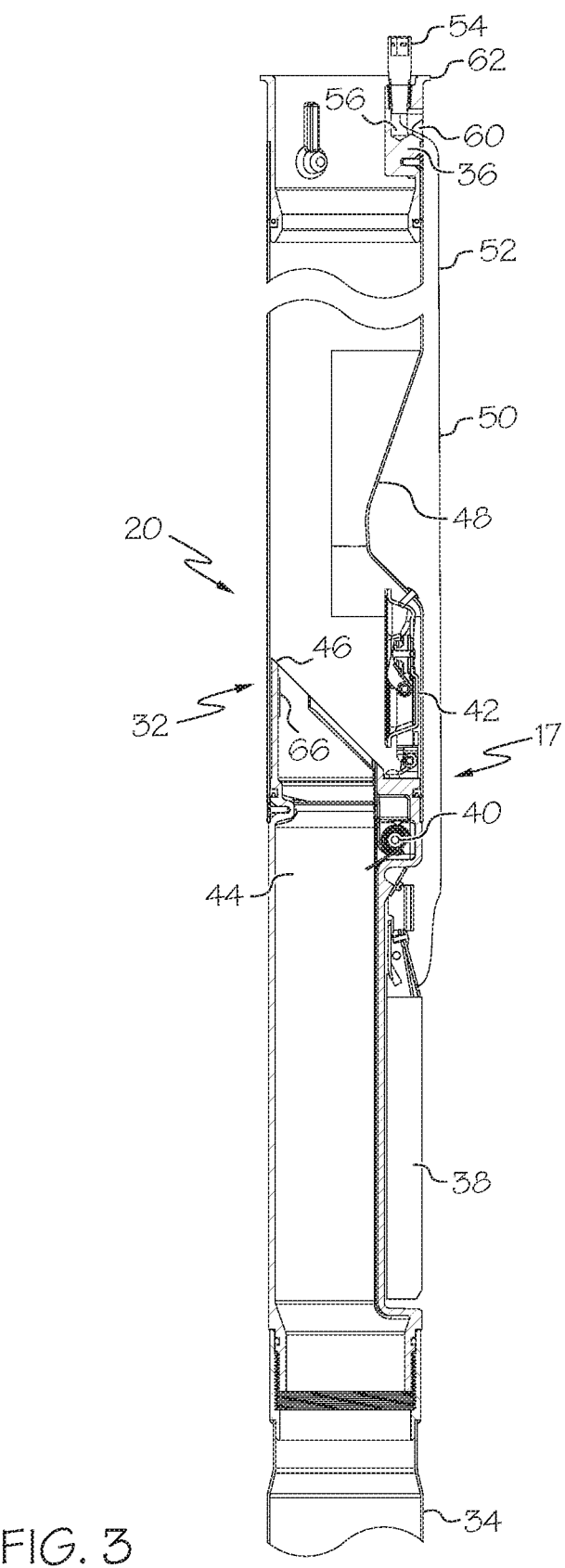
FIG. 3 is a detail view of the overfill prevention valve of FIG. 2, shown in its open position.
Figure 4:
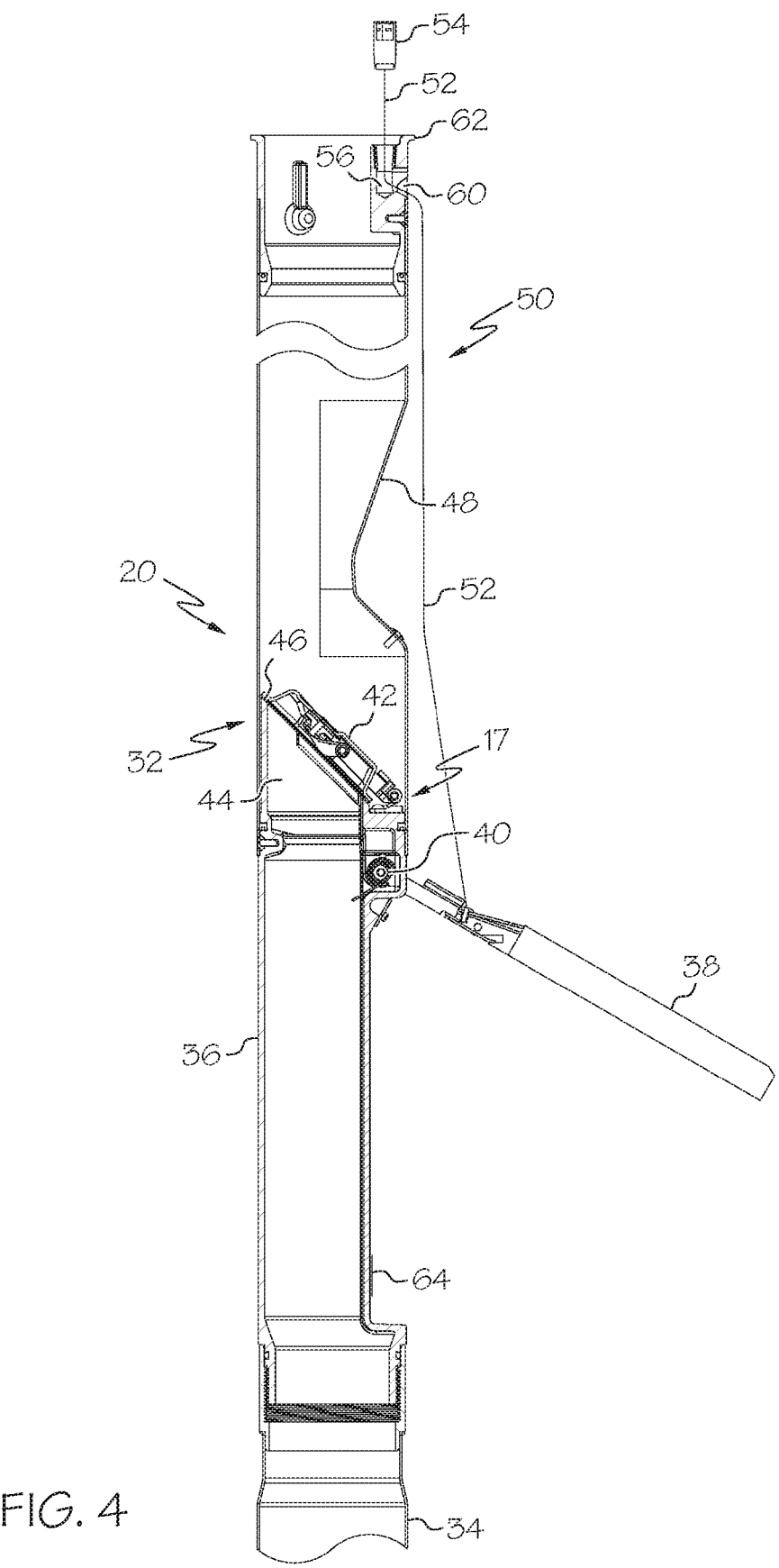
FIG. 4 is a detail view of the overfill prevention valve of FIG. 2.

As best shown in FIGS. 3 and 4, one embodiment of the overfill prevention valve 32 includes a body 36 and a float 38 moveably coupled to the body 36. In the illustrated embodiment the float 38 is a generally flat, rectangular component pivotally coupled to the body 36 at pivot connection 40. The float 38 can be made of a relatively lightweight, buoyant material and reside in its lower position, as shown in FIG. 3, when the tank 10 is not in its fully or nearly-full state. The float 38, therefore has a lesser density than gasoline. The tank 10 may store fluid 11 (e.g. in one case gasoline as mentioned above that is more dense than the float 38, such that when the tank 10 is in a full or nearly full condition (i.e., in one case, when about 90%, or about 95%, of the inner volume of the tank 10 is full), the fluid 11 surrounding or adjacent to the float 38 causes the float 38 to float/move to its upper position (FIGS. 2 and 4).

The valve 32 includes a blocking component or flapper 42 in its fluid path 44, and the flapper 42 is movable between an open position and a closed position. When the flapper 42 is in its open position, as shown in FIG. 3, the flapper 42 generally does not seal or block fluid from flowing through the fill pipe system 20/valve 32/fluid path 44, and is generally vertically-oriented in the illustrated embodiment. When the flapper 42 is in its closed position (FIGS. 2 and 4), the flapper 42 sealingly engages an associated flapper seat 46 to generally seal, or block fluid from flowing through, the fill pipe system 20/valve 32/fluid path 44, and is oriented at about a 45° angle in the illustrated embodiment.

The float 38 is operatively coupled to the flapper 42 by a linkage 17 or the like. In particular, when the float 38 is in its lower position, the float 38 causes the flapper 42 to be in its open position, and when the float 38 is in its upper position, the float 38 causes the flapper 42 to be in its closed position. In this manner, the flapper 42 moves to its closed position when the tank 10 is full or nearly full due to upward movement of the float 38. The full or partial closure of the flapper 42/valve 32 causes a pressure increase in the dispensing line 16, which can be manually or automatically sensed to trigger a manual or automatic stoppage of refueling to prevent overfilling of the tank 10.

When fluid 11 is removed from the full tank 10 (e.g. during usage of the tank 10), fluid levels in the tank 10 drop and the float 38 moves to its lower position, thereby opening the valve 32/flapper 42 when the tank 10 is not full or nearly full. In the illustrated case the fill valve 32/fill pipe system 20 includes an indentation 48 positioned above the flapper 42 to generally shield the flapper 42 from fluid flow during refilling to prevent the flapper 42 from being inadvertently closed. However, once the flapper 42 is sufficiently closed by the float 38, the leading edge of the flapper 42 may be exposed to fluid flow during refilling, which causes the flapper 42 to rapidly close. In some cases, however, the float 38 may also be moveable to various intermediate positions between its upper and lower positions, thereby causing the flapper 42 to correspondingly move to various intermediate positions between its open and closed positions. The overfill valve 32 may also be configured such that the flapper 42 cannot be closed unless the float 38 is at least partially or fully raised. The valve 32 may include a drainage valve, in the form of a poppet valve, which opens when the flapper 42 is closed to allow any fluid trapped above the closed flapper 42 to be drained into the tank 10.

It should be understood that a particular type of overfill prevention valve 32 has been described above. However, the present system and method can be utilized with a wide variety of overfill valves 32, including valves with floats of varying configurations and actuation, such as axially-sliding floats, annular or ring-shaped floats extending around the valve, ball floats, and valves with varying configurations and embodiments of blocking mechanisms besides flappers, such as poppet valves and other fluid-blocking valves, and/or have other differences in structure and/or operation. For example, certain embodiments of overfill valves are shown in U.S. Pat. Nos. 7,243,675 to Kesterman et al.; 6,913,047 to Kane et al; 5,174,345 to Kesterman et al.; 5,850,849 to Wood, which can be used in the system disclosed herein, and the entire contents of all of these patents are incorporated by reference herein.

The valve system 32 includes or is operatively coupled to an actuator 50 that is operatively coupled to the valve 32 to shift the position/state of the valve 32 and/or float 38 and/or blocking component 42 to enable testing of the valve 32. In the illustrated embodiment the actuator 50 includes an actuator body 52 in the form of a vertically-extending wire, chain, cable or the like having a lower portion coupled to the float 38. An upper portion of the actuator body 52 is, in the illustrated embodiment, secured to a plug 54 that is removably receivable in a recess 56 of the body 36. The lower and upper portions of the actuator body 52 can be coupled to the float 38 and plug 54, respectively, via swivel mounts or the like to prevent binding of the connections.

The actuator 50 can be utilize to test the operation of the valve 32 and/or float 38 and/or flapper 42. In particular, in order to utilize the actuator 50 a user may first disengage the plug 54 from the recess 56. The plug 54 can be removably and/or sealingly mounted to the recess 56/body 36 by any of a wide variety of manners, such as by a threadable connection, a twist-lock arrangement, by an interference fit, or other manners. The plug 54 and/or recess 56 may carry an O-ring or other seal to provide a fluid-tight connection therebetween. However, although the plug 54 can provide various gripping and/or sealing advantages, the plug 54 may not necessarily reside in a recess 56, and in some cases the actuator 50 may not even include the plug 54. The actuator 50 should be made of materials which can withstand exposure to the fuels and fluids listed above.

In any case, once the user has extracted or otherwise accessed the actuator 50/plug 54, the user can pull upwardly on the actuator 50/plug 54, thereby causing the float 38 to pivot from its lower position (FIG. 3) (assuming the tank 10 is not in its filled or nearly-filled configuration) to its upper position (FIGS. 2 and 4). Assuming that the valve 32 is in proper operating condition, such movement of the float 38 thereby causes the flapper 42 to move from its open to closed position. Due to a spring force supplied to the float 38 and/or by gravity forces, the float 38 may automatically return to its lower position, and the flapper 42 to its open position, when the operator releases the actuator 50/plug 54.

In this manner, the operator of the actuator 50 can test operation of the valve 32 and/or float 38 and/or flapper 42 to ensure proper operation thereof. In particular, a user operating the actuator 50 (or another user) can visually look into the fill pipe system 20/overfill valve 32 to visually check the position of the flapper 42 and/or track movement of the flapper 42 in accordance with corresponding manual movement of the actuator 50/float 38. The user can also ensure that there are not obstructions to the free movement of the flapper 42 and float 38, and that they can move freely. In some cases the user may use a light source, such as a flash light, directed down the valve 32/fill pipe system 20 to aid in the visual inspection.

In many cases, the valve 32, float 38 and/or flapper 42 are not directly manually accessible, or are not directly manually accessible from outside the tank 10, as shown in FIGS. 1 and 2. However, in the valve system and method described herein, the upper portion of the actuator 50 is directly manually accessible by simply reaching into the spill bucket 24 and the extension tube 30 to grasp the actuator 50, while the user remains kneeling, crouching or sitting on the ground surface. The system thereby enables or provides testing operations and verification of proper operation at a position remote from the valve 32, float 38 and/or flapper 42. In other words, the valve 32 (including the float 38 and/or flapper 42) may not be directly manually accessible from outside the tank 10, but the actuator 50 is directly manually accessible from outside the tank 10.

The extension tube 30 can have a diameter sufficiently large (i.e. at least about four inches in one case) to allow manual access therethrough to reach the plug 54/actuator 50. The vertical distance between the actuator 50/plug 54 and the top 22 of the fill pipe system 20 may be less than about 18 inches in one case to allow a user to reach the actuator 50/plug 54 by reaching only his/her forearm through the fitting 28/extension tube 30/spill bucket 24, but in any case may be less than the length of an average user's arm, such as less than about 33 inches.

The actuator body 52 can have a wide variety of forms besides a wire, chain or cable, but in many cases may take the form of a generally vertically oriented elongated body. For example, rather than including or taking the form of a wire, chain, cable or the like, which can only transmit tension forces, the actuator body 52 can include or take the form of a more rigid component, such as a rod or the like, which can transmit both tension and compression forces. In this case, then, the float 38 could be manually moved from both its lower position to its upper position, and from its upper position to its lower position, thereby causing the flapper 42 to both open and close to enable more robust testing. When a rigid actuator 52 is utilized, the shape of the recess 56 and opening 60 may need to be adjusted to create more of a linear path of access through the valve body 36. Moreover, the embodiments shown herein illustrate the actuator 50 directly connected to the float 38; however, if desired in certain embodiments the actuator 50 may instead be directly coupled to the flapper 42 to test operation of the flapper 42 by direct actuation thereof.

As best shown in FIGS. 3 and 4, an upper portion of the actuator body 52 passes through an opening 60 in the upper portion of the valve body 36 which communicates with the recess 56. Thus, although in this embodiment the actuator 50 generally resides outside the valve body 36/fluid path 44, the plug 54 is positioned within the outer perimeter/outer circumference of the valve body 36. In this manner the plug 54, or at least the upper surface thereof, may be considered to be positioned in, or in fluid communication with, the fluid path 44 of the valve 32/fill pipe system 20. However, when the plug 54 is sealingly received in the recess 56, the recess 54 and opening are positioned 60 fully or partially externally of, and fluidly isolated from, the fluid path 44 of the valve 32/fill pipe system 20. In this manner, the actuator 50 can still be directly manually accessed, but when the plug 54 is secured in place the actuator 50 does not provide any leakages in the fluid path 44 of the valve 32/fill pipe system 20.

Moreover, in this embodiment the actuator 50 terminates at a position at or adjacent to the upper end of the valve 32 to ensure easy manual access. In addition the actuator 50 and plug 54 are recessed or spaced axially below an upper lip 62 of the valve, and spaced radially inwardly from a radially outer edge of the valve body 36. In this manner the actuator 50 and plug 54 do not interfere with the mounting of any other connectors or the like, such as the spill bucket 24 or fitting 29, to the upper lip 62 of the valve 32.

As shown in FIG. 2, in the illustrated embodiment an upper part of the actuator body 52 is positioned between the body 36 of the valve 32 and the connecting tube 31/fitting 29. In this case, the actuator body 52 is freely moveable in an annular gap positioned between the connecting tube 31/fitting 29 and the body 36. The actuator body 52 fits through a gap 71 on an inner surface of the fill neck 73 of the tank 10. The tube 31 helps to protect and shield the portions of the actuator 50 positioned externally of the tank 10. If desired a protective component, such as a cover (not shown), can be positioned about the actuator 50, on an external surface of the body 36 inside of the tank 10, to provide further protection to the actuator 50.

The valve 32 may also include one or more sensors to detect the position or state of the valve 32, float 38 and/or flapper 42 to aid in testing operations. For example, a sensor 64 (FIG. 4) may be located on the body 36 of the valve 32 and can detect when the float 38 is in (or not in) its lower position to provide feedback to an operator. The sensor 64 can include or be operatively coupled to a controller or other device which can provide an output of the sensor 64 by visual, audio, electronic or other means. The sensor 64 may be able to communicate by a wired connection, or wireless (e.g. RF signal) connection. The sensor 64 can take a wide variety of forms, including but not limited to a pressure or force sensor, weight sensor, optical sensor, membrane switch, electromagnetic radiation sensor, contact sensor, ultrasonic sensor, proximity sensor, electric field sensor, etc.

Moreover, the sensor 64, or additional sensors, can be positioned at various other locations in the system, such as at the pivot point 40 for the float 38 and/or the pivot location of the flapper 42, at various positions adjacent to the flapper 42 (see e.g. illustrative sensor 66 of FIG. 3) to detect its closed and/or open state, etc. The sensors(s) may be able to provide a binary on/off output, but could instead or also be able to provide output relating to the precise positioning of the valve 32, float 38 and/or flapper 42. The sensor(s) can provide additional confirmation when used in conjunction with the actuator 50 described above. Alternately, the sensor(s) can be used alone, without the actuator 50, to detect the position/state of the valve 32.

Figure 5:
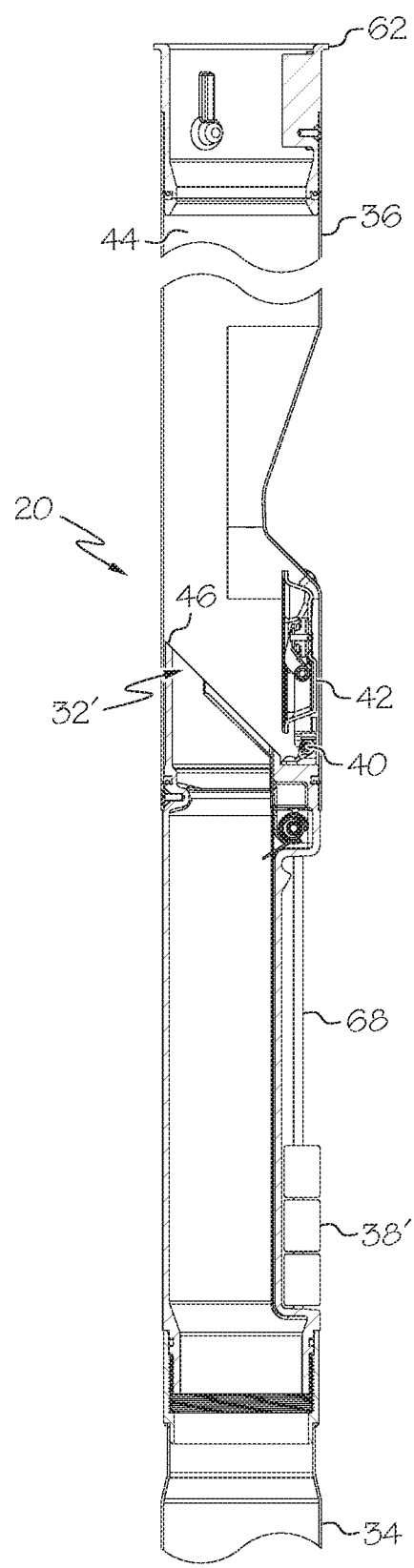
FIG. 5 is a schematic, side cross section of an alternate overfill prevention valve, shown in its open position.
Figure 6:
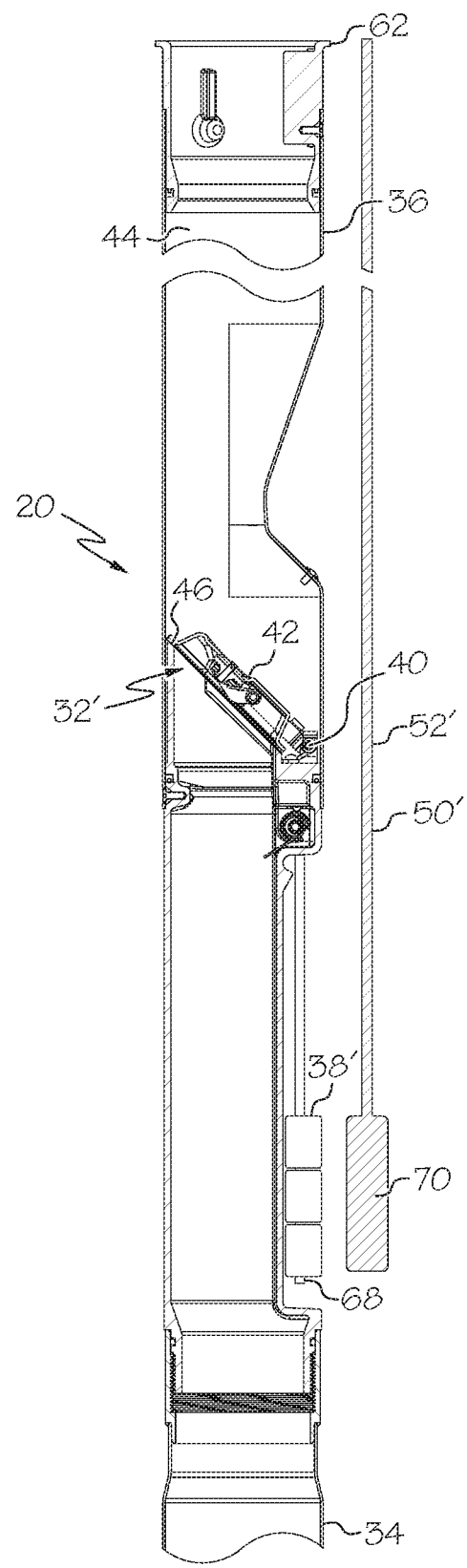
FIG. 6 illustrates the overfill prevention valve of FIG. 5, moved to its closed position by an actuator positioned outside the valve.
Figure 7:
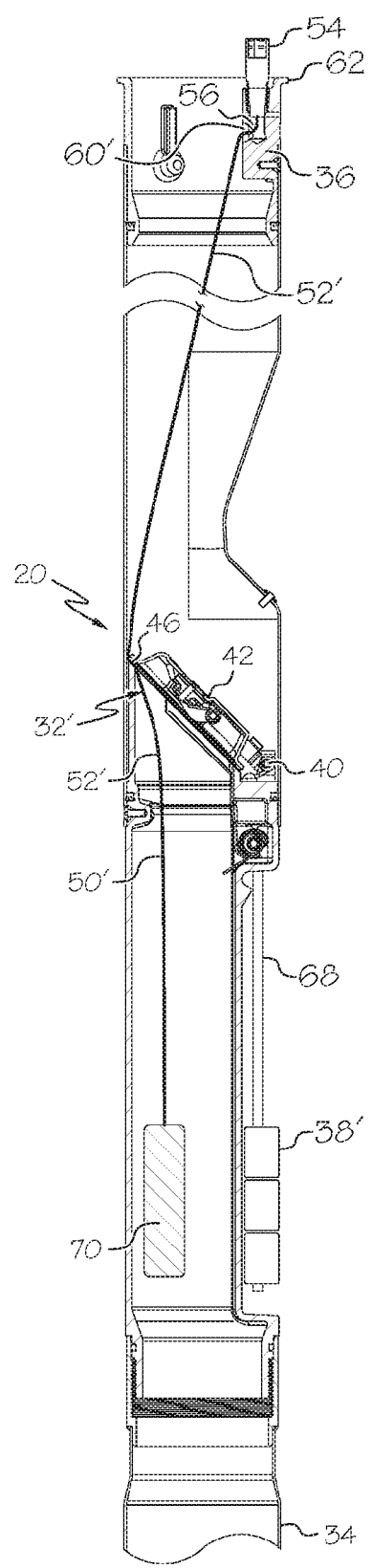
FIG. 7 illustrates the overfill prevention valve of FIG. 5, moved to its closed position by an actuator positioned inside the valve.

FIGS. 5-7 illustrate another embodiment of the actuator 50' used in conjunction with an alternate valve 32'. The alternate valve 32' includes a flapper 42 pivotable about pivot point 40 from its open (vertical) position, as shown in FIG. 5, to its closed (angled) position, as shown in FIGS. 6 and 7. The valve 32' includes a float 38' that is operatively coupled to the flapper 42 via an arm 68. In particular, when the float 38' is raised (e.g. due to surrounding fluid) the float 38' moves vertically upward, thereby also raising the arm 68 and causing the flapper 42 to close. When the float 38' is lowered, it lowers the arm 68, causing the flapper 42 to open. In this embodiment, then, the float 38' moves vertically, as opposed to the pivoting motion of the float 38 shown in FIGS. 1-4.

The actuator 50 described and shown above can be utilized in conjunction with the valve 32' shown in FIGS. 5-7. In addition, FIGS. 6-7 illustrate an alternate actuator 50' including an actuator body 52' with a magnet or magnetic material 70 coupled thereto. In this case the float 38' may be made or, or include, or be positioned adjacent to a magnetic or magnetizable material, such as metal. In this case, when the magnet 70 is positioned adjacent to the float 38', magnet 70 and float 38' magnetically interact such the actuator 38' can be lifted vertically upwardly when a user moves the actuator 50' upwardly. The actuator 50' can thus be used to move the float 38' to its upper position, which should cause the flapper 42 to close. The operator of the actuator 50' can thereby test operation of the valve 32' in the same manner as outlined above.

FIG. 6 illustrates the actuator 52' in an external configuration in which the actuator 50' is positioned outside the valve 32'/fluid flow path 44. The magnet 70 may make contact with the float 38' in this case, and the contact may be broken when a sufficient separation force is applied by the user. In some cases, however, the actuator 50' can move the float 38' without making any contact with the float 38', merely by being positioned sufficiently close. In the embodiment shown in FIG. 6 the actuator 50' could be manually accessed via the plug 54/recess 56/opening 60 as outlined above, but could also be accessed/stored in other manners.

FIG. 7 illustrates the actuator 50' in an internal configuration in which the actuator 50' is positioned inside the valve 32'/fluid flow path 44. In this case the actuator 50' could be manually accessed via the plug 54/recess 56, although in this case the opening 60 could be in fluid communication with the fluid flow path 44 (e.g., opening 60' in FIG. 7), or other manner of access could be provided (e.g. FIG. 7A).

Figure 7A:
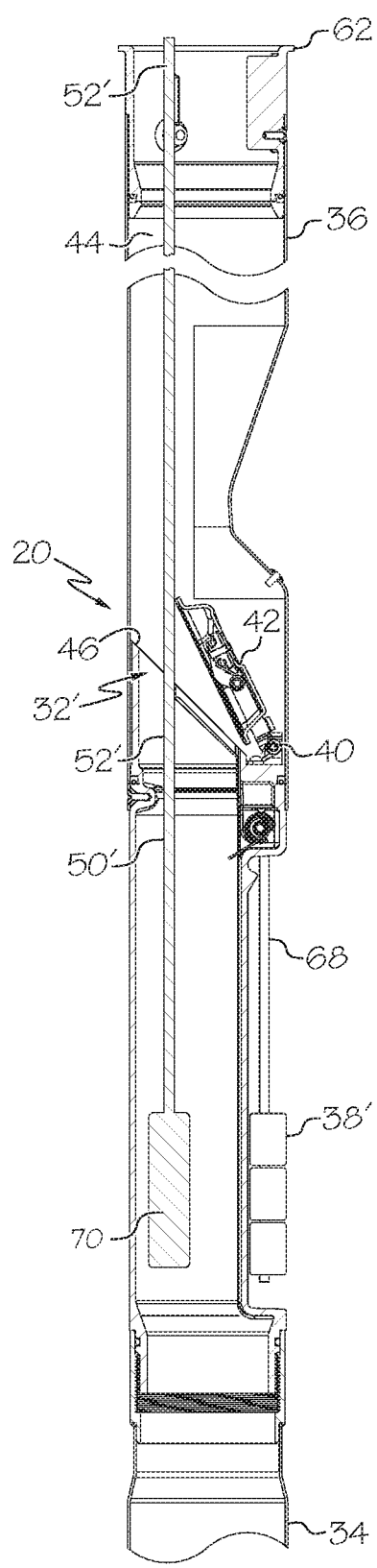
FIG. 7A illustrates the overfill prevention valve of FIG. 5, moved away from its open position by an actuator positioned inside the valve.

In the internal configurations shown in FIGS. 7 and 7A, the actuator body 52' may be partially closed upon by the flapper 42 when the valve 32' is closed by the actuator 50'. However, since the actuator body 52' can block full closure of the flapper 42, as shown in FIGS. 7 and 7A the valve 32' may still move away from its open position and the actuator may 52' may still be able to be raised/lowered to move the magnet 70 away from the float to enable the float 38' to return to its closed position, fully opening the valve 32' and enabling extraction of the actuator body 52'. The internal configuration can be useful in that the actuator system is entirely internal to the valve 32', and no breaches to the fluid flow path 44 are required, minimizing the chances for leakage.

In addition, it should be understood that rather than making the component 70 of a magnetic material and the float 38' of a magnetizable material, the float 38' could include, or be made of, a magnet, and the component 70 could be made of a magnetizable material. In addition, it should be understood that the magnet-style actuator 52' shown in FIGS. 5-7 could also be used in conjunction with the valve 32 shown in FIGS. 2-4, so long as the valve 32 includes magnets/magnetizable materials in the appropriate positions.

Although the invention is shown and described with respect to certain embodiments, it should be clear that modifications will occur to those skilled in the art upon reading and understanding the specification, and the present invention includes all such modifications.

What is claimed is:

1. An overfill prevention valve system comprising:
   an overfill prevention valve including a fluid path and a blocking component positioned in the fluid path, wherein said blocking component is movable between a closed position wherein the blocking component generally blocks fluid from flowing through the fluid path and an open position wherein the blocking component generally allows fluid to flow through the fluid path, the overfill prevention valve further including a float operatively coupled to the blocking component and positioned externally of said fluid path; and
   an actuator that is manually operable to magnetically interact with and move the float, which movement of said float in turn causes the blocking component to move away from said open position to thereby enable testing of the overfill prevention valve.

2. The valve system of claim 1 wherein said actuator is manually operable to cause said float to move from a lower position to an upper position, which in turn causes said blocking component to move away from said open position toward said closed position.

3. The valve system of claim 1 wherein the actuator is operable at a position remote from said valve.

4. The valve system of claim 1 wherein said actuator includes an elongated actuator body.

5. The valve system of claim 4 wherein said actuator body is a wire, or a cable, or a chain, or a rod.

6. The valve system of claim 4 wherein said actuator is generally vertically movable to cause the blocking component to move away from said open position toward said closed position to thereby test the overfill prevention valve.

7. The valve system of claim 4 wherein said actuator and said valve are configured such that a lower portion of said actuator body is configured to magnetically interact with said valve while an upper portion of said actuator body is manually accessible to enable said manual operation of said actuator.

8. The valve system of claim 1 wherein said actuator and said float are configured to magnetically interact when said actuator is positioned in said fluid path to enable the actuator to move the float.

9. The valve system of claim 1 further including a fluid storage tank, and wherein at least part of said valve is positioned in said fluid storage tank, and at least part of said actuator is positionable externally of said fluid storage tank during operation of said actuator.

10. The valve system of claim 1 further comprising a fluid storage tank, and wherein at least part of the valve is positioned in the tank and not directly manually accessible from outside the tank, and wherein the actuator is configured to be directly manually accessible from outside said tank while in use, and wherein the storage tank has a fill pipe system positioned at least in an upper portion of the storage tank, and wherein at least part of said valve is positioned in or forms part of said fill pipe system.

11. The valve system of claim 1 further comprising a fluid storage tank, and wherein at least part of the valve is positioned in the tank, wherein the float is configured to be in an upper position when sufficiently dense fluid is positioned adjacent to said float, representing a full or nearly full condition for the storage tank, causing the blocking component to be in the closed position, and wherein the float is configured to be in a lower position when sufficiently dense fluid is not positioned adjacent to said float, representing a not-full or not-nearly full condition for the storage tank, causing the blocking component to be in the open position.

12. The valve system of claim 1 further comprising a sensor configured to sense a position of at least one of said float or said blocking component and provide an electronic output relating to said position.

13. The valve system of claim 1 wherein at least part of said actuator is manually positionable in said fluid path and is manually removable from said fluid path.

14. The valve system of claim 1 wherein said actuator is configured to magnetically interact with said valve to magnetically move the blocking component away from the open position.

15. The valve system of claim 1 wherein one of said actuator or said float includes a magnet, and the other one of said actuator or said float includes a supplemental magnet or a magnetizable material to enable said actuator to magnetically interact with said float.

16. The valve system of claim 1 wherein said actuator is operable to indirectly magnetically move the blocking component.

17. The valve system of claim 1 wherein said float is positioned immediately adjacent to said fluid path.

18. The valve system of claim 1 wherein said actuator is positionable at an axial depth below said blocking component.

19. The valve system of claim 1 wherein said float is made of a relatively lightweight, buoyant material.

20. The valve system of claim 19 wherein said float has a lesser density than gasoline.

21. A method for manipulating an overfill prevention valve comprising:
    accessing a system including the overfill prevention valve including a fluid path and a blocking component positioned in said fluid path, wherein said blocking component is movable between a closed position wherein the blocking component generally blocks fluid from flowing through the fluid path and an open position wherein the blocking component generally allows fluid to flow through the fluid path, the valve further including a float operatively coupled to the blocking component and positioned externally of said fluid path;
    positioning at least part of an actuator in said fluid path; and manually operating said actuator to magnetically move the blocking component away from the open position to thereby test the overfill prevention valve.

22. The method of claim 21 wherein a step of manually operating said actuator includes inserting said at least part of said actuator into said fluid path such that said actuator magnetically causes said movement of said blocking component.

23. The method of claim 21 wherein said actuator takes a form of a rod and wherein said manually operating step includes inserting said actuator in said fluid path to generally about a same axial depth as said valve.

24. The method of claim 21 wherein said operating step includes operating said actuator such that said actuator magnetically interacts with said float to thereby move said float, which movement of said float thereby causes said blocking component to move.

25. An overfill prevention valve system comprising:
an overfill prevention valve including:
   a fluid path;
   a blocking component positioned in the fluid path, wherein said blocking component is movable between a closed position wherein the blocking component generally blocks fluid from flowing through the fluid path and an open position wherein the blocking component generally allows fluid to flow through the fluid path; and
   a float operatively coupled to the blocking component and positioned externally of said fluid path, wherein said float includes or is made of a magnetic or magnetizable material such that said overfill prevention valve is manually testable by magnetically moving said float to thereby move the blocking component away from the open position.

26. The valve system of claim 25 wherein the float is configured to magnetically interact with an actuator that is manually operable to thereby move the blocking component away from the open position as a result of said actuator being positioned at least partially in the fluid path to thereby enable testing of the overfill prevention valve.

27. The valve system of claim 26 wherein one of said actuator or said float includes a magnet, and the other one of said actuator or said float includes a supplemental magnet or a magnetizable material to enable said float to magnetically interact with said actuator.

28. The valve system of claim 26 wherein said float is configured to magnetically interact with said actuator when at least part of said actuator is positioned outside said fluid path.

29. The valve system of claim 25 further comprising an actuator configured to magnetically interact with said float when at least part of the actuator is positioned in the fluid path to thereby move the blocking component away from the open position to thereby test the overfill prevention valve.

30. The valve system of claim 29 wherein said actuator is vertically manually movable in said fluid path.

31. The valve system of claim 25 wherein said overfill prevention valve is configured to be manually magnetically testable by a user positioned outside said fluid path utilizing an actuator, at least part of which is positioned externally of said fluid path defined by said valve.

32. The valve system of claim 25 wherein said float is positioned immediately adjacent to said fluid path.

33. The valve system of claim 25 wherein said float includes or is made of a magnetic material.

34. The valve system of claim 25 further comprising a fluid storage tank, and wherein at least part of the valve is positioned in the tank, wherein the float is configured to be in an upper position when sufficiently dense fluid is positioned adjacent to said float, representing a full or nearly full condition for the storage tank, causing the blocking component to be in the closed position, and wherein the float is configured to be in a lower position when sufficiently dense fluid is not positioned adjacent to said float, representing a not-full or not-nearly full condition for the storage tank, causing the blocking component to be in the open position.

35. An overfill prevention system comprising:
   a valve system including a valve configured to be positioned in or form part of a fluid path of a pipe and being movable between a closed position and an open position, wherein the valve blocks fluid from flowing through the valve system more when said valve is in said closed position as compared to when said valve is in said open position; and
   a float operatively coupled to the valve such that said float is positioned externally of said fluid path, wherein said valve system is configured to removably receive an actuator in the valve system to thereby enable said actuator and said float to magnetically interact to move the valve away from said open position to thereby enable testing of the valve.

36. The system of claim 35 further comprising said actuator, and wherein one of said actuator or said float includes a magnet, and the other one of said actuator or said float includes a supplemental magnet or a magnetizable material to enable said actuator to magnetically interact with and move said float.

37. The system of claim 35 further including said pipe, and wherein said valve system is positioned in said pipe, and wherein said valve system is configured to removably receive at least part of said actuator therein at generally about a same axial depth as said float.

38. The system of claim 37 further comprising a tank, wherein said pipe is positioned in said tank, and wherein at least part of said actuator is positionable externally of said tank while magnetically interacting with said float.

39. The valve system of claim 35 further comprising said actuator, and wherein said actuator is a rod.

40. The valve system of claim 35 wherein said float is positioned immediately adjacent to said fluid path.

41. The valve system of claim 35 wherein said float includes or is made of a magnetic material.

42. The system of claim 35 further comprising said actuator, and wherein said actuator and said float each include a magnet to enable said actuator to magnetically interact with and move said float.

* * * * *

UNITED STATES PATENT AND TRADEMARK OFFICE
CERTIFICATE OF CORRECTION

PATENT NO. : 9,463,971 B2
APPLICATION NO. : 13/401213
DATED : October 11, 2016
INVENTOR(S) : Jeromy E. Higgins et al.

It is certified that error appears in the above-identified patent and that said Letters Patent is hereby corrected as shown below:

IN THE SPECIFICATION

In Column 3, Line 14 reads "-ing to prevent overfilling of the tank 10."
It should read:

-- -ing to prevent overfilling of the tank 10. The float 38 is thus configured to be in its upper position when sufficiently dense fluid is positioned adjacent to the float 38, representing a full or nearly full condition for the storage tank 10, causing the flapper/blocking component 42 to be in the closed position. The float 38 is also thereby configured to be in a lower position when sufficiently dense fluid is not positioned adjacent to the float 38, representing a not-full or not-nearly full condition for the storage tank 10, causing the flapper/blocking component 42 to be in the open position. --

In Column 5, Line 28 reads "and opening are positioned 60 fully or partially externally of,"
It should read:

-- and opening are positioned fully or partially externally of, --

In Column 6, Line 39 reads "70 and float 38' magnetically interact such the actuator 38'"
It should read:

-- 70 and float 38' magnetically interact such the float 38' --

Signed and Sealed this
Twenty-ninth Day of November, 2016

Michelle K. Lee
*Director of the United States Patent and Trademark Office*